(12) United States Patent
Lee et al.

(10) Patent No.: US 12,289,377 B2
(45) Date of Patent: Apr. 29, 2025

(54) METHOD AND DEVICE FOR SUPPORTING EDGE COMPUTING IN VIRTUAL RADIO ACCESS NETWORK

(71) Applicant: Samsung Electronics Co., Ltd., Suwon-si (KR)

(72) Inventors: Gunhee Lee, Suwon-si (KR); Hyesuk Kim, Suwon-si (KR); Yuhyun An, Suwon-si (KR); Sungrok Yoon, Suwon-si (KR); Seokyong Lee, Suwon-si (KR); Soonyoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/467,247

(22) Filed: Sep. 14, 2023

(65) Prior Publication Data
US 2024/0007536 A1    Jan. 4, 2024

Related U.S. Application Data

(63) Continuation of application No. PCT/KR2022/003056, filed on Mar. 4, 2022.

(30) Foreign Application Priority Data

Apr. 9, 2021  (KR) .......................... 10-2021-0046524

(51) Int. Cl.
*G06F 15/173*     (2006.01)
*H04L 67/2871*   (2022.01)
(Continued)

(52) U.S. Cl.
CPC ........ *H04L 67/289* (2013.01); *H04L 67/2871* (2013.01); *H04L 67/5682* (2022.05)

(58) Field of Classification Search
CPC .................. H04L 67/289; H04L 67/5682; H04L 67/2871
(Continued)

(56) References Cited

U.S. PATENT DOCUMENTS 6,742,038 B2 * 5/2004 Britt, Jr. ............... H04L 67/562
                                                        455/418
9,513,891 B2   12/2016 Sun et al.
(Continued)

FOREIGN PATENT DOCUMENTS

KR      10-1216390 B1    12/2012
KR   10-2020-0083988 A    7/2020
(Continued)

OTHER PUBLICATIONS

International Search Report dated Jun. 7, 2022, issued in International Patent Application No. PCT/KR2022/003056.
(Continued)

*Primary Examiner* — Alicia Baturay
(74) *Attorney, Agent, or Firm* — Jefferson IP Law, LLP

(57) ABSTRACT

The disclosure relates to a communication technique and system that fuse $5^{th}$ generation (5G) or pre-5G communication system with Internet of things (IoT) technology to support higher data transfer rate after 4th generation (4G) communication system, such as long term evolution (LTE). The disclosure applies to intelligent services (e.g., a smart home, a smart building, a smart city, a smart car or a connected car, healthcare, digital education, retail, security and safety related services, and the like) based on 5G communication technology and IoT related technology. A method and a device for supporting edge computing in a virtual radio access network are provided.

16 Claims, 8 Drawing Sheets

(51) Int. Cl.
　　*H04L 67/289*　　(2022.01)
　　*H04L 67/5682*　　(2022.01)
(58) Field of Classification Search
　　USPC .......................................................... 709/224
　　See application file for complete search history.

(56) References Cited

U.S. PATENT DOCUMENTS

| | | | | |
|---|---|---|---|---|
| 9,596,522 | B2* | 3/2017 | Odlund | H04N 21/8451 |
| 10,512,015 | B2 | 12/2019 | Lubenski et al. | |
| 10,530,645 | B2 | 1/2020 | Yang et al. | |
| 10,791,507 | B1* | 9/2020 | Mukherjee | H04W 4/029 |
| 10,797,968 | B2* | 10/2020 | Suthar | H04L 41/0894 |
| 10,897,493 | B2* | 1/2021 | Yang | H04L 65/1016 |
| 11,212,199 | B2* | 12/2021 | Suthar | H04W 24/02 |
| 11,259,211 | B2* | 2/2022 | Kuo | H04W 28/085 |
| 11,288,018 | B2* | 3/2022 | Potluri | H04L 67/1097 |
| 11,304,109 | B1* | 4/2022 | Potharaju | H04W 8/24 |
| 11,368,427 | B1* | 6/2022 | Gan | H04L 61/5014 |
| 11,368,881 | B1* | 6/2022 | Cai | H04W 4/024 |
| 11,496,201 | B2* | 11/2022 | Tsui | H04W 72/0473 |
| 11,510,208 | B2* | 11/2022 | Lekutai | H04W 76/15 |
| 11,601,819 | B2* | 3/2023 | Chou | H04W 16/10 |
| 11,632,312 | B2* | 4/2023 | Suthar | H04L 41/0895 709/223 |
| 2003/0191818 | A1* | 10/2003 | Rankin | H04L 67/04 709/219 |
| 2018/0248787 | A1 | 8/2018 | Rajagopal et al. | |
| 2018/0270780 | A1 | 9/2018 | Xiong et al. | |
| 2019/0116517 | A1 | 4/2019 | Liu | |
| 2019/0273635 | A1 | 9/2019 | McNamee et al. | |
| 2019/0278631 | A1 | 9/2019 | Guim Bernat et al. | |
| 2019/0335414 | A1 | 10/2019 | Rasanen et al. | |
| 2020/0162348 | A1 | 5/2020 | Suthar et al. | |
| 2021/0042160 | A1 | 2/2021 | Alamouti et al. | |

FOREIGN PATENT DOCUMENTS

| | | |
|---|---|---|
| WO | 2019/179471 A1 | 9/2019 |
| WO | 2020/092933 A1 | 5/2020 |
| WO | 2020/226979 A2 | 11/2020 |

OTHER PUBLICATIONS

Harris et al., Latency Aware Placement in Multi-access Edge Computing; 2018 IEEE International Conference on Network Softwarization (NetSoft 2018)—Technical Sessions.

Wang et al., Architectural and Cost Implications of the 5G Edge NFV Systems; 2019 IEEE 37th International Conference on Computer Design (ICCD).

Julien Gedeon et al., What the Fog? Edge Computing Revisited: Promises, Applications and Future Challenges, Oct. 21, 2019.

Joint Optimization of Edge Computing Architectures and Radio Access Networks (Oct. 11, 2018, https://ieeexplore.ieee.org/document/8489916).

FluidRAN: Optimized vRAN/MEC Orchestration (Apr. 16, 2018, https://dl.acm.org/doi/10.1109/INFOCOM.2018.8486243).

Provisioning RAN as a Service (RANaaS) Connectivity in an Optical Metro Network Through Netconf and Yang (Sep. 1, 2018, https://www.semanticscholar.org/paper/Provisioning-RAN-as-a-Service-(RANaaS)-ConnectivitySgambelluri-Paolucci/6892790a1a69acfc5aa948823753ca80baadcf9e).

Andres et al., Joint Optimization of Edge Computing Architectures and Radio Access Networks, Oct. 11, 2018, IEEE.

Andres et al., FluidRAN: Optimized vRAN/MEC Orchestration, Oct. 11, 2018, IEEE.

A. Sgambelluri et al., Provisioning RAN as a Service (RANaaS) Connectivity in an Optical Metro Network Through Netconf and Yang, Nov. 15, 2018, IEEE.

* cited by examiner

METHOD AND DEVICE FOR SUPPORTING EDGE COMPUTING IN VIRTUAL RADIO ACCESS NETWORK

CROSS-REFERENCE TO RELATED APPLICATION(S)

This application is a continuation application, claiming priority under § 365(c), of an International application No. PCT/KR2022/003056, filed on Mar. 4, 2022, which is based on and claims the benefit of a Korean patent application number filed on Apr. 9, 2021, in the Korean Intellectual Property Office, the disclosure of which is incorporated by reference herein in its entirety.

BACKGROUND

1. Field

The disclosure relates to edge computing. More particularly, the disclosure relates to a method and device for supporting multi-access edge computing (MEC) in a virtual radio access network (vRAN).

2. Description of Related Art

Efforts are being made to develop an improved $5^{th}$ generation (5G) communication system or pre-5G communication system in order to meet the growing demand for wireless data traffic since the commercialization of a $4^{th}$ generation (4G) communication system. For this reason, the 5G communication system or pre-5G communication system is called a beyond 4G network communication system or a post long term evolution (post LTE) system.

In order to achieve a high data transfer rate, the 5G communication system is being considered for implementation in an ultra-high frequency millimeter wave (mm-Wave) band (e.g., 60 gigahertz (GHz) band). In order to mitigate a path loss of radio waves and increase a propagation distance of radio waves in an ultra-high frequency band, beamforming, massive multiple input multiple output (MIMO), full dimensional MIMO (FD-MIMO), array antenna, analog beam-forming, and large scale antenna technologies are being discussed in the 5G communication system.

In addition, in order to improve network of the system, technologies, such as evolved small cell, advanced small cell, cloud radio access network (cloud RAN), ultra-dense network, device to device communication (D2D), wireless backhaul, moving network, cooperative communication, coordinated multi-points (CoMP), and receive interference cancellation are being developed in the 5G communication system.

In addition, in the 5G system, advanced coding modulation (ACM) schemes, such as hybrid frequency shift keying and quadrature amplitude modulation (FQAM) and sliding window superposition coding (SWSC) and advanced access technology, such as filter bank multi carrier (FBMC), non-orthogonal multiple access (NOMA), and sparse code multiple access (SCMA) are being developed.

In the 5G system, support for various services compared to the existing 4G system is being considered. For example, the most representative services may include enhanced mobile broad band (eMBB), ultra-reliable and low latency communication (URLLC), massive machine type communication (mMTC), evolved multimedia broadcast/multicast service (eMBMS), and the like. In addition, a system providing the URLLC service may be referred to as a URLLC system, and a system providing the eMBB service may be referred to as an eMBB system, and the like. In addition, the terms service and system may be used interchangeably.

Among them, the URLLC service is a service that is newly considered in the 5G system, unlike the existing 4G system, and requires ultra-high reliability (e.g., packet error rate of about 10-5) and low latency (e.g., about 0.5 msec) conditions compared to other services. In order to satisfy these strict requirements, the URLLC service may need to apply a shorter transmission time interval (TTI) than the eMBB service, and various operation methods using this are being considered.

Meanwhile, the Internet is evolving from a human-centered connection network in which humans generate and consume information to an Internet of things (IoT) network in which information is exchanged and processed between distributed components, such as things. Internet of everything (IoE) technology, which combines IoT technology with big data processing technology through connection with cloud servers, and the like, is also emerging. In order to implement IoT, technology elements, such as sensing technology, wired/wireless communication and network infrastructure, service interface technology, and security technology are required, and recently, technologies, such as sensor network, machine to machine (M2M), machine type communication (MTC) for connection between objects are being researched.

In an IoT environment, an intelligent Internet technology (IT) service that creates new values in human life by collecting and analyzing data generated from connected objects may be provided. IoT may be applied to fields, such as a smart home, a smart building, a smart city, a smart car or a connected car, a smart grid, health care, a smart home appliance, an advanced medical service, and the like through convergence and combination between existing information technology (IT) technology and various industries.

Accordingly, various attempts are being made to apply the 5G communication system to the IoT network. For example, technologies, such as sensor network, machine to machine (M2M), and machine type communication (MTC) are being implemented by techniques, such as beamforming, MIMO, and array antenna, which are 5G communication technologies. The application of cloud radio access network (cloud RAN) as a big data processing technology described above may also be said as an example of the convergence of 5G technology and IoT technology.

In addition, a number of communication operators are researching a technology for supporting multi-access edge computing in a virtual radio access network.

The above information is presented as background information only to assist with an understanding of the disclosure. No determination has been made, and no assertion is made, as to whether any of the above might be applicable as prior art with regard to the disclosure.

SUMMARY

Recently, edge computing technology for transmitting data by using an edge server has been discussed. The edge computing technology may include, for example, multi-access edge computing (MEC) or fog computing. The edge computing technology may mean a technology that provides data to an electronic device through a location geographically close to the electronic device, for example, a separate server (hereinafter referred to as an 'edge server' or 'MEC server') installed inside or near a base station. For example, among at least one application installed in the electronic device, an application that requires low latency may transmit and receive data through an edge server installed in a geographically close location, not through a server located in an external data network (DN) (e.g., the Internet).

Recently, a service using the edge computing technology (hereinafter referred to as 'MEC-based service' or 'MEC service') has been discussed, and research and development on electronic devices to support a MEC-based service are being conducted.

In addition, the MEC-based service is being provided to a mobile communication electronic device by disposing mobile edge node (e.g., there may be an x86 server, and the like) behind layer1/layer2/layer3 (L1/L2/L3) equipment configured with distributed unit (DU) and central unit (CU) to provide the MEC-based service. In particular, in a case of a cloud computing service, there is also a case where a cloud edge node exists as one Internet server outside the core network farther than the L1/L2/L3 equipment based on the terminal.

However, an ultra-reliable low-latency communication (URLLC) function required by the 5G system is a function to further reduce the latency rate, and there may be a demand to process a user traffic more quickly in order to support this function. However, there is a problem in that it is difficult to quickly process the user traffic with only the structure of the mobile edge node and the cloud edge node as described above.

In addition, a structure of virtual base station (virtual radio access network (vRAN)) in which all L1/L2/L3 operations are implemented as software on a server (e.g., the x86 server) beyond the centralized-RAN (C-RAN) and distributed-RAN (D-RAN) structures configured with existing hardware devices is being developed.

However, a 3rd party (a company that develops software or hardware used in other products) company or a communication operator that actually wants to provide data and an application service to a user lacks interfacing technology for a communication protocol and a virtual base station structure, and thus a linked operation with software provided in the virtual base station is limited, so there is a problem in using the MEC-based service.

Aspects of the disclosure are to address at least the above-mentioned problems and/or disadvantages and to provide at least the advantages described below. Accordingly, an aspect of the disclosure is to provide each 3rd party company or communication operator with the MEC-based service that efficiently implements a URLLC function even in the virtual base station.

Additional aspects will be set forth in part in the description which follows and, in part, will be apparent from the description, or may be learned by practice of the presented embodiments.

In accordance with an aspect of the disclosure, a virtual distributed unit (vDU) of a virtual base station in a wireless communication system supporting mobile edge computing is provided. The vDU includes a first connector configured to transmit and receive a signal with a radio unit (RU) of the virtual base station, a second connector configured to transmit and receive a signal with a virtual central unit (vCU) of the virtual base station, a memory configured to store cache data, and a at least one processor configured to control receive a protocol data unit (PDU) received from a terminal by the RU through the first connector, identify whether indicator information of the PDU is indicator information related to mobile edge computing, identify whether cache data corresponding to data requested from the PDU is present in the memory, in case that the indicator information is indicator information related to mobile edge computing, and transmit the cache data to the RU through the first connector, in case that the cache data is present in the memory.

In accordance with another aspect of the disclosure, a virtual central unit (vCU) of a virtual base station in a wireless communication system supporting mobile edge computing is provided. The vCU includes a first connector configured to transmit and receive a signal with a virtual distributed unit (vDU) of the virtual base station, a second connector configured to transmit and receive a signal with a core network device, a memory configured to store cache data, and a at least one processor configured to control to receive a protocol data unit (PDU) received from a terminal by the vDU through the first connector, identify whether indicator information of the PDU is indicator information related to mobile edge computing, identify whether cache data corresponding to data requested from the PDU is present in the memory, in case that the indicator information is indicator information related to mobile edge computing, and transmit the cache data to the vDU through the first connector, in case that the cache data is present in the memory.

In accordance with another aspect of the disclosure, a method performed by a virtual distributed unit (vDU) of a virtual base station in a wireless communication system supporting mobile edge computing is provided. The method includes receiving a protocol data unit (PDU) from a radio unit, identifying whether indicator information of the PDU is indicator information related to mobile edge computing, identifying whether cache data corresponding to data requested from the PDU is stored, in case that the indicator information is indicator information related to mobile edge computing, and transmitting the cache data to the RU, in case that the cache data is stored.

In accordance with another aspect of the disclosure, a method performed by a virtual central unit (vCU) of a virtual base station in a wireless communication system supporting mobile edge computing is provided. The method includes receiving a protocol data unit (PDU) from a virtual distributed unit, identifying whether indicator information of the PDU is indicator information related to mobile edge computing, identifying whether cache data corresponding to data requested from the PDU is stored, in case that the indicator information is indicator information related to mobile edge computing, and transmitting the cache data to the vDU, in case that the cache data is stored.

According to an embodiment of the disclosure, by processing user traffic in a vDU or vCU without going through the core network, it has an effect of further reducing the latency, which is a URLLC function required by the 5G system, and has an effect of reducing the installation cost for the core network, which was required when providing an existing MEC-based service.

In addition, according to an embodiment of the disclosure, by providing the MEC-based service in a virtual base station suitable for each 3rd party company or communication operator, each 3rd party company or communication operator reduces the storage capacity required to provide the MEC-based service in a general base station, and there is an effect that the remaining storage capacity secured through this may be used for another service.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
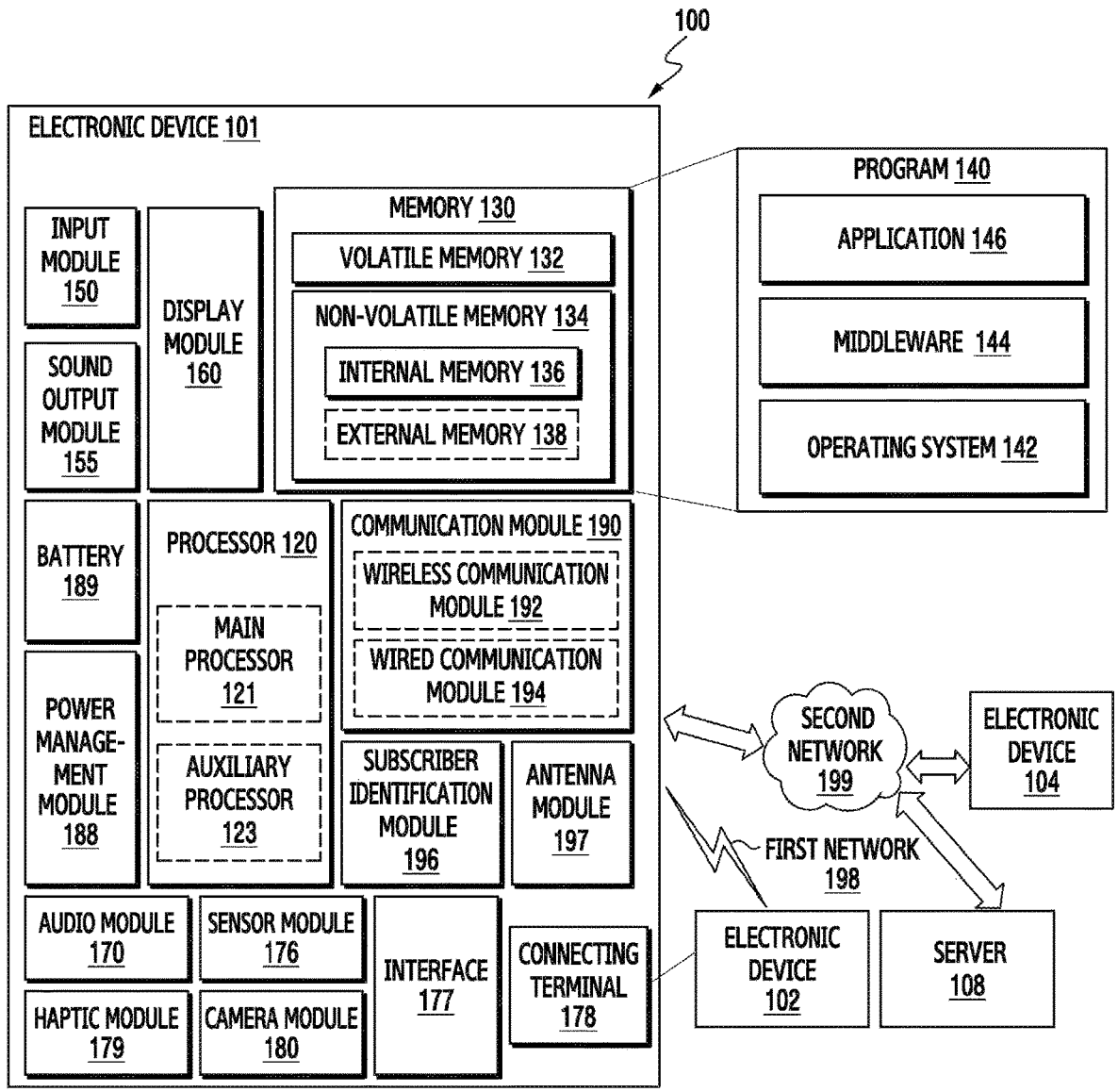
FIG. 1 is a drawing illustrating an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing an embodiment of the disclosure, a description of a technical content that are well known in the art to which the disclosure belongs and not directly related to the disclosure may be omitted. This is to more clearly convey the gist of the disclosure without obscuring it by omitting unnecessary description.

For the same reason, in the accompanying drawings, some components may be exaggerated, omitted, or schematically illustrated. In addition, the size of each component may not fully reflect the actual size. A same reference number may be assigned to identical or corresponding components in each drawing.

Advantages and features of the disclosure and a method for achieving them may become clear with reference to embodiments described below in conjunction with the accompanying drawings. The disclosure is not limited to the embodiments disclosed below and may be implemented in various different forms. These embodiments are provided only to make the disclosure of the disclosure complete and to completely inform the scope of the disclosure to those having ordinary knowledge in the art to which the disclosure belongs, and the disclosure may be defined by the scope of claims. The same reference number may refer to the same component throughout the description.

In addition, each block may indicate a module, segment, or part of a code that includes one or more executable instructions for executing specific logical function(s). In addition, in some alternative execution examples, it may be possible for functions mentioned in the blocks to occur out of order. For example, two blocks illustrated in succession may actually be performed at substantially same time, or the blocks may sometimes be performed in reverse order according to the corresponding function.

At this time, a term '~unit' used in the embodiment of the disclosure means software or a hardware component, such as field programmable gate array (FPGA) or application-specific integrated circuit (ASIC), and the 'unit' may perform certain roles. However, the '— unit' may not mean limited to software or hardware. The 'unit' may be configured to be in an addressable storage medium and may be configured to reproduce one or more processors. Therefore, as an example, the 'unit' may include components, such as software components, object-oriented software components, class components, and task components, processes, functions, properties, procedures, subroutines, segments of program code, drivers, firmware, microcode, circuit, data, database, data structures, tables, arrays, and variables. A function provided within components and the '~units' may be combined into smaller numbers of components and 'units' or further separated into additional components and 'units'. In addition, components and '~units' may be implemented to play one or more central processing units (CPUs) in a device or a secure multimedia card. In addition, in an embodiment of the disclosure, 'unit' may include one or more processors.

For convenience of description below, the disclosure may use terms and names defined in 3rd generation partnership project long term evolution (3GPP LTE) or 3GPP fifth generation new radio (5G NR) standard. However, the disclosure is not limited by the above terms and names and may be equally applied to a system conforming to another standard.

Recently, edge computing technology for transmitting data by using an edge server has been discussed. The edge computing technology may include, for example, multi-access edge computing (MEC) or fog computing. The edge computing technology may mean a technology that provides data to an electronic device through a location geographically close to the electronic device, for example, a separate server (hereinafter referred to as an 'edge server' or 'MEC server') installed inside or near a base station. For example, among at least one application installed in the electronic device, an application that requires low latency may transmit and receive data through an edge server installed in a geographically close location, not through a server located in an external data network (DN) (e.g., the Internet).

Recently, a service using the edge computing technology (hereinafter referred to as 'MEC-based service' or 'MEC service') has been discussed, and research and development on electronic devices to support a MEC-based service are being conducted.

In addition, the MEC-based service is being provided to a mobile communication electronic device by disposing mobile edge node (e.g., there may be an x86 server, and the like) behind layer1/layer2/layer3 (L1/L2/L3) equipment configured with distributed unit (DU) and central unit (CU) to provide the MEC-based service. In particular, in a case of a cloud computing service, there is also a case where a cloud edge node exists as one Internet server outside the core network farther than the L1/L2/L3 equipment based on the terminal.

However, an ultra-reliable low-latency communication (URLLC) function required by the 5G system is a function to further reduce the latency rate, and there may be a demand to process a user traffic more quickly in order to support this function. However, there is a problem in that it is difficult to quickly process the user traffic with only the structure of the mobile edge node and the cloud edge node as described above.

In addition, a structure of virtual radio access network (vRAN) in which all L1/L2/L3 operations are implemented as software on a server (e.g., the x86 server) beyond the centralized-RAN (C-RAN) and distributed-RAN (D-RAN) structures configured with existing hardware devices is being developed.

However, a $3^{rd}$ party (a company that develops software or hardware used in another products) company or a communication operator that actually wants to provide data and an application service to a user lacks interfacing technology for a communication protocol and a virtual base station structure, and thus a linked operation with software provided in the virtual base station is limited, so there is a problem in using the MEC-based service.

In order to address this issue, according to an embodiment of the disclosure, by processing user traffic in a virtual distributed unit (vDU) or a virtual central unit (vCU) without going through the core network, it has an effect of further reducing the latency, which is a URLLC function required by the 5G system, and has an effect of reducing the installation cost for the core network, which was required when providing an existing MEC-based service.

In addition, according to an embodiment of the disclosure, by providing the MEC-based service in the virtual base station suitable for each $3^{rd}$ party company or communication operator, each $3^{rd}$ party company or communication operator reduces the storage capacity required to provide the MEC-based service in a general base station, and there is an effect that the remaining storage capacity secured through this may be used for another service.

Hereinafter, operations of the base station of the first embodiment and second embodiment of the disclosure for addressing the above issue will be described with reference to the drawings.

FIG. 1 is a drawing illustrating an electronic device in a network environment according to an embodiment of the disclosure.

Referring to FIG. 1, an electronic device 101 in a network environment 100 may communicate with an external electronic device 102 through a first network 198 (e.g., a short-range wireless communication network), or an external electronic device 104 or a server 108 through a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a haptic module 179, a camera module 180, a power management module 188, a battery 189, a communication module 190, a subscriber identification module 196, or an antenna module 197. In some embodiments of the disclosure, in the electronic device 101, the at least one of the components (e.g., the display module 160 or the camera module 180) may be omitted, or one or more other components may be added. In some embodiments of the disclosure, some of the components may be implemented as a single integrated circuit. For example, the sensor module 176 (e.g., a fingerprint sensor, an iris sensor, or an illumination sensor) may be implemented while being embedded in the display module 160 (e.g., a display).

The processor 120 may execute, for example, software (e.g., a program 140) to control at least one other component (e.g., a hardware or software component) of the electronic device 101 coupled with the processor 120 and may perform various data processing or computation. According to an embodiment of the disclosure, as at least part of the data processing or computation, the processor 120 may load a command or data received from another component (e.g., the sensor module 176 or the communication module 190) in a volatile memory 132, may process the command or the data stored in the volatile memory 132, and may store resulting data in a non-volatile memory 134. According to an embodiment of the disclosure, the processor 120 may include a main processor 121 (e.g., a central processing unit or an application processor), and an auxiliary processor 123 (e.g., a graphic processing unit, an image signal processor, a sensor hub processor, or a communication processor) that is operable independently from, or in conjunction with, the main processor 121. Additionally or alternatively, the auxiliary processor 123 may be configured to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, for example, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., the image signal processor or the communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored in the memory 130 as software, and may include, for example, an operating system 142, middleware 144, or an application 146.

The input module 150 may receive a command or data to be used for a component (e.g., the processor 120) of the electronic device 101, from an outside (e.g., a user) of the electronic device 101. The input module 150 may include, for example, a microphone, a mouse, a keyboard, or a digital pen (e.g., a stylus pen).

The sound output module 155 may output sound signals to the outside of the electronic device 101. The sound output module 155 may include, for example, a speaker or a receiver. The speaker may be used for a general purpose, such as multimedia playback or recording playback, and the receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuit to control the corresponding device. According to an embodiment of the disclosure, the display module 160 may include a touch circuit adapted to detect a touch, or a sensor circuit (e.g., a pressure sensor) adapted to measure the intensity of force incurred by the touch.

The audio module 170 may convert a sound into an electrical signal, or conversely, convert an electrical signal into sound. According to an embodiment of the disclosure, the audio module 170 may obtain the sound through the input module 150 or may output the sound through the sound output module 155 or an external electronic device (e.g., the external electronic device 102 (e.g., a speaker or a headphone)) directly or wirelessly coupled with the electronic device 101.

The sensor module 176 may detect an operational state (e.g., power or temperature) of the electronic device 101 or an external environmental state (e.g., a state of a user), and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more designated protocols to be used for the electronic device 101 to be coupled with the external electronic device (e.g., the external electronic device 102) directly or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector through which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user through his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 388 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication through the established communication channel. The communication module 190 may include one or more communication processors that are operated independently from the processor 120 (e.g., the application processor) and supports the direct (e.g., wired) communication or the wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication module). A corresponding one of these communication modules may communicate with the external electronic device through the first network 198 (e.g., a short-range communication network, such as Bluetooth, wireless fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be integrated as one component (e.g., a single chip), or may be implemented as a plurality of components (e.g., multi chips) separate from each other. The wireless communication module 192 may identify and authenticate the electronic device 101 in a communication network, such as the first network 198 or the second network 199, by using subscriber information (e.g., international mobile subscriber identity (IMSI)) stored in the subscriber identification module 196.

The antenna module 197 may transmit or receive a signal or power to or from the outside (e.g., the external electronic device). According to an embodiment of the disclosure, the antenna module may include one antenna including a radiating element configured with a conductive material or a conductive pattern formed in or on a substrate (e.g., a PCB). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may be transmitted or received between the communication module 190 and the external electronic device through the selected at least one antenna. According to an embodiment of the disclosure, another component (e.g., a radio frequency integrated circuit (RFIC)) other than the radiating element may be additionally formed as part of the antenna module 197.

At least some of the components may be coupled to each other and exchange signals (e.g., commands or data) therebetween through an inter-peripheral communication scheme (e.g., a bus, general purpose input and output (GPIO), serial peripheral interface (SPI), or mobile industry processor interface (MIPI)).

According to an embodiment of the disclosure, the commands or data may be transmitted or received between the electronic device 101 and the external electronic device 104 through the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, in case that the electronic device 101 should perform a certain function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
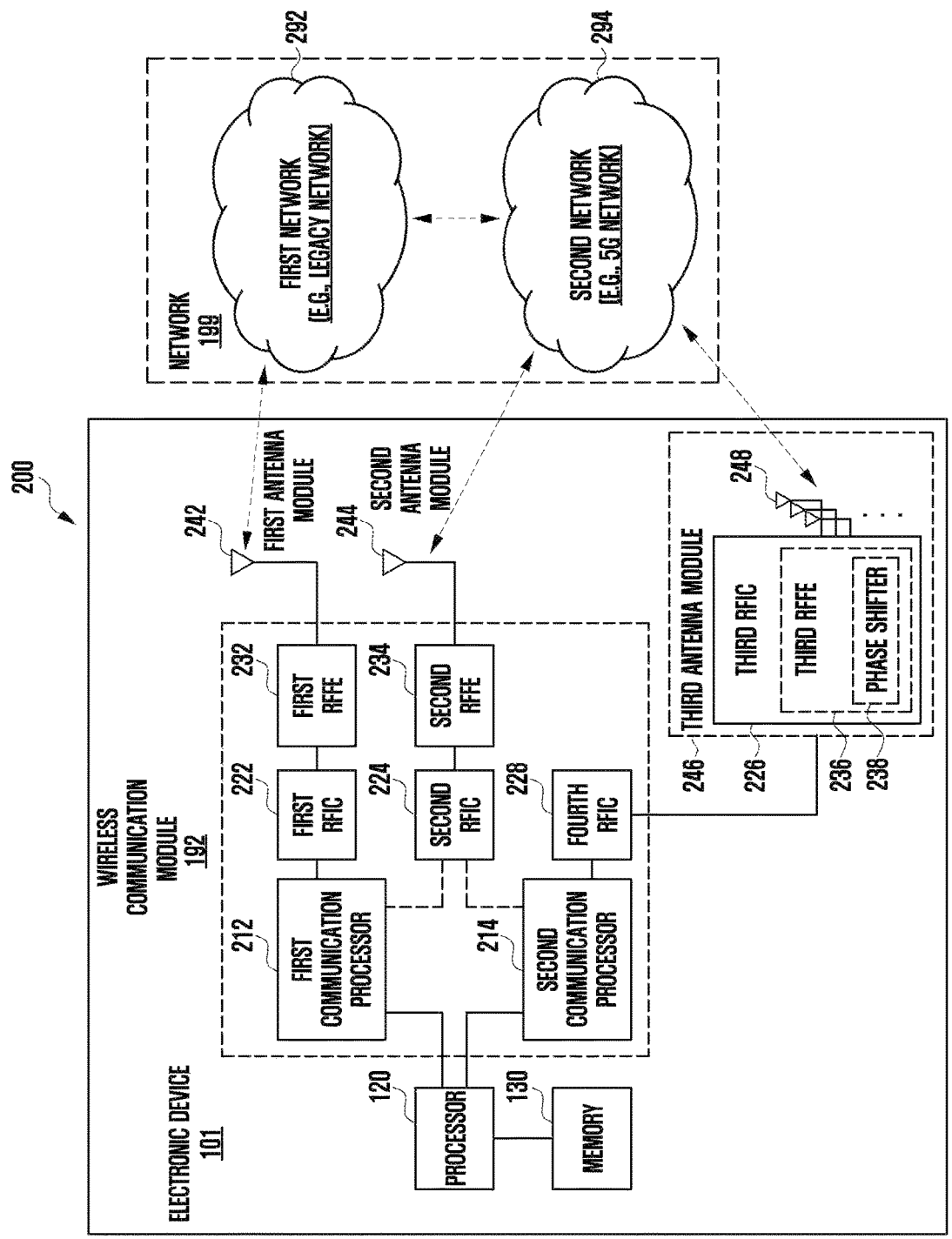
FIG. 2 is a drawing illustrating an electronic device supporting legacy network communication and 5G network communication according to an embodiment of the disclosure.

FIG. 2 is a drawing illustrating an electronic device supporting legacy network communication and 5G network communication according to an embodiment of the disclosure.

Referring to FIG. 2, it illustrates a block diagram 200 of an electronic device 101 for supporting legacy network communication and 5G network communication. The electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The network 199 may include a first network 292 and a second network 294. According to another embodiment of the disclosure, the electronic device 101 may further include at least one of the components described in FIG. 1, and the network 199 may further include at least one other network. According to an embodiment of the disclosure, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment of the disclosure, the fourth RFIC 228 may be omitted or may be included as a part of the third RFIC 226.

The first communication processor 212 may support establishment of a communication channel of a band to be used for wireless communication with the first network 292, and legacy network communication through the established communication channel. According to various embodiments of the disclosure, the first network may be a legacy network including a second generation (2G), third generation (3G), 4G, or long term evolution (LTE) network. The second communication processor 214 may support establishment of a communication channel corresponding to a designated band (e.g., about 6 GHz to about 60 GHz) among the bands to be used for wireless communication with the second network 294, and 5G network communication through the established communication channel. According to various embodiments of the disclosure, the second network 294 may be a 5G network defined by 3GPP. In addition, according to an embodiment of the disclosure, the first communication processor 212 or the second communication processor 214 may support establishment of a communication channel corresponding to another designated band (e.g., about 6 GHz or less) among the bands to be used for wireless communication with the second network 294, and 5G network communication through the established communication channel. According to an embodiment of the disclosure, the first communication processor 212 and the second communication processor 214 may be implemented in a single chip or a single package. According to various embodiments of the disclosure, the first communication processor 212 or the second communication processor 214 may be formed in the single chip or the single package with the processor 120, the auxiliary processor 123, or the communication module 190.

When transmitted, the first RFIC 222 may convert a baseband signal generated by the first communication processor 212 into a radio frequency (RF) signal of about 700 megahertz (MHz) to about 3 GHz used in the first network 292 (e.g., a legacy network). When received, the RF signal may be obtained from the first network 292 (e.g., the legacy network) through an antenna (e.g., the first antenna module 242) and may be preprocessed through RFFE (e.g., the first RFFE 232). The first RFIC 222 may convert the preprocessed RF signal into the baseband signal so that it may be processed by the first communication processor 212.

When transmitted, the second RFIC 224 may convert the baseband signal generated by the first communication processor 212 or the second communication processor 214 into a Sub6 band (e.g., about 6 GHz or less) RF signal (hereinafter, referred to as a 5G Sub6 RF signal) used in the second network 294 (e.g., the 5G network). When received, the 5G Sub6 RF signal may be obtained from the second network 294 (e.g., the 5G network) through an antenna (e.g., the second antenna module 244) and may be preprocessed through RFFE (e.g., the second RFFE 234). The second RFIC 224 may convert the preprocessed 5G Sub6 RF signal into the baseband signal so that it may be processed by a corresponding communication processor among the first communication processor 212 or the second communication processor 214.

The third RFIC 226 may convert the baseband signal generated by the second communication processor 214 into a 5G Above6 band (e.g., about 6 GHz to about 60 GHz) RF signal (hereinafter, referred to as a 5G Above6 RF signal) to be used in the second network 294 (e.g., the 5G network). When received, the 5G Above6 RF signal may be obtained from the second network 294 (e.g., the 5G network) through an antenna (e.g., the antenna 248) and may be preprocessed through the third RFFE 236. The third RFIC 226 may convert the preprocessed 5G Above6 RF signal into the baseband signal so that it may be processed by the second communication processor 214. According to an embodiment of the disclosure, the third RFFE 236 may be formed as a part of the third RFIC 226.

The electronic device 101, according to an embodiment of the disclosure, may include a fourth RFIC 228 separately from or at least as part of the third RFIC 226. In this case, the fourth RFIC 228 may convert the baseband signal generated by the second communication processor 214 into an intermediate frequency band (e.g., about 9 GHz to about 11 GHz) RF signal (hereinafter, referred to as an IF signal) and then may transmit the IF signal to the third RFIC 226. The third RFIC 226 may convert the IF signal into the 5G Above6 RF signal. When received, the 5G Above6 RF signal may be received from the second network 294 (e.g., the 5G network) through an antenna (e.g., the antenna 248) and may converted into the IF signal by the third RFIC 226. The fourth RFIC 228 may convert the IF signal into the baseband signal so that the second communication processor 214 may process it.

According to an embodiment of the disclosure, the first RFIC 222 and the second RFIC 224 may be implemented as a single chip or at least a part of a single package. According to an embodiment of the disclosure, the first RFFE 232 and the second RFFE 234 may be implemented as a single chip or at least a part of a single package. According to an embodiment of the disclosure, at least one antenna module among the first antenna module 242 or the second antenna module 244 may process RF signals of a plurality of corresponding bands, by being omitted or combined with another antenna module.

According to an embodiment of the disclosure, the third RFIC 226 and the antenna 248 may form a third antenna module 246 by being disposed on the same substrate. For example, the wireless communication module 192 or the processor 120 may be disposed on a first substrate (e.g., a main PCB). In this case, the third RFIC 226 may be disposed in a partial area (e.g., a lower surface) of a second substrate (e.g., a sub-PCB) separate from a first substrate, and the antenna 248 may be disposed in another partial area (e.g., an upper surface) to form the third antenna module 246. By disposing the third RFIC 226 and the antenna 248 on the same substrate, it is possible to reduce the length of the transmission line therebetween. This, for example, may reduce a loss (e.g., attenuation) of a signal of a high frequency band (e.g., about 6 GHz to about 60 GHz) used in 5G network communication by a transmission line. As a result, the electronic device 101 may improve the quality or rate of communication with the second network 294 (e.g., the 5G network).

According to an embodiment of the disclosure, the antenna 248 may be formed as an antenna array including a plurality of antenna elements that may be used for beamforming. In this case, the third RFIC 226 may include a plurality of phase shifters 238 corresponding to the plurality of antenna elements, for example, as part of the third RFFE 236. When transmitted, each of the plurality of phase shifters 238 may convert a phase of the 5G Above6 RF signal to be transmitted to the outside of the electronic device 101 (e.g., a base station of the 5G network) through the corresponding antenna element. When received, each of the plurality of phase shifters 238 may convert the phase of the 5G Above6 RF signal received from the outside through the corresponding antenna element into the same or substantially the same phase. This enables transmitting or receiving through beamforming between the electronic device 101 and the outside.

The second network 294 (e.g., the 5G network) may be operated independently of the first network 292 (e.g., the legacy network) (e.g., Stand-Alone (SA)) or may be connected and operated (e.g., Non-Stand Alone (NSA)). For example, a 5G network may only have an access network (e.g., a 5G radio access network (RAN) or a next generation RAN (NG RAN)), and may not have a core network (e.g., a next generation core (NGC)). In this case, after accessing the access network of the 5G network, the electronic device 101 may access an external network (e.g., the Internet) under the control of a core network (e.g., evolved packed core (EPC)) of the legacy network. Protocol information for communication with the legacy network (e.g., LTE protocol information) or protocol information for communication with the 5G network (e.g., New Radio (NR) protocol information) may be stored in a memory 230 and may be accessed by other components (e.g., the processor 120, first communication processor 212, or second communication processor 214).

Figure 3:
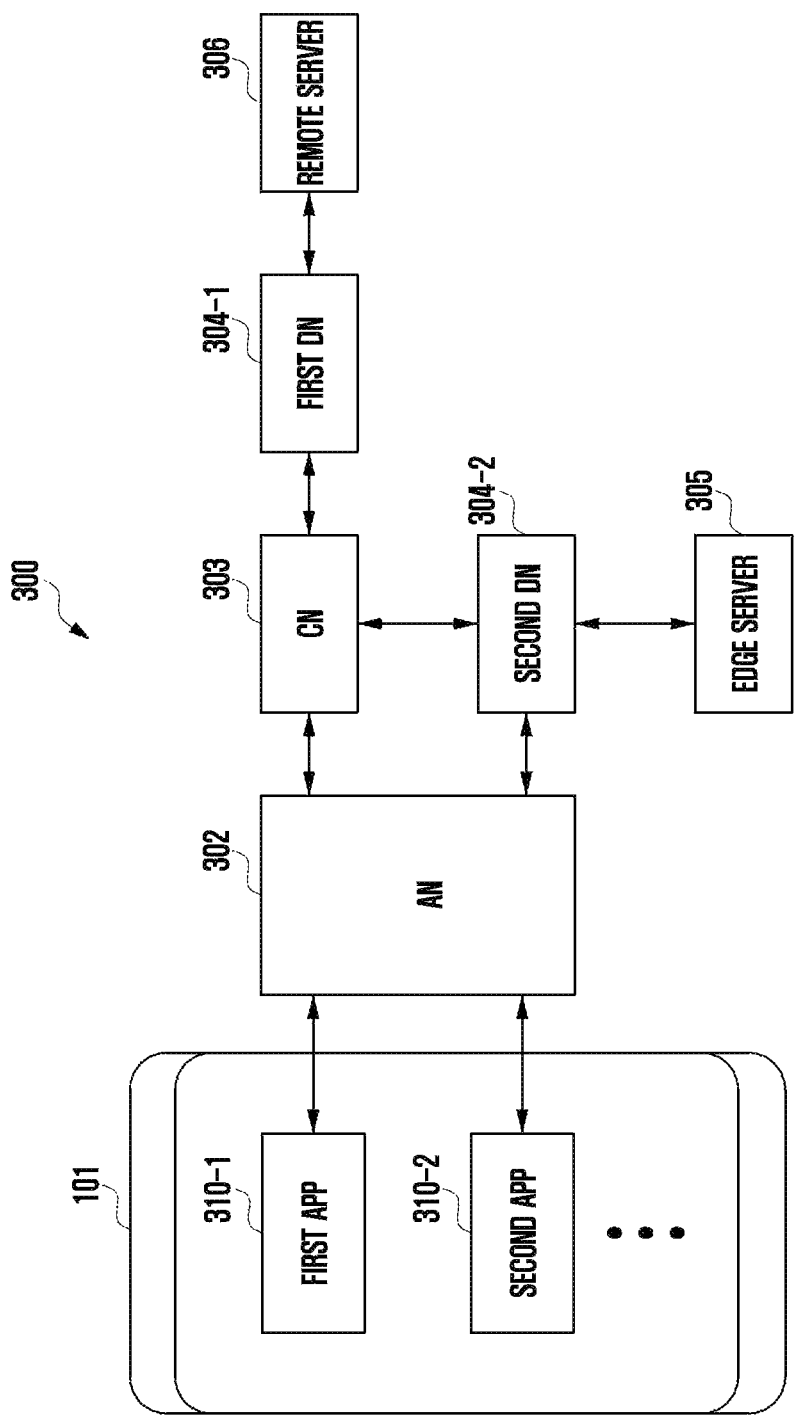
FIG. 3 is a drawing illustrating that an edge server supports an MEC-based service in a wireless communication system according to an embodiment of the disclosure.

FIG. 3 is a drawing 300 illustrating that an edge server supports an MEC-based service in a wireless communication system according to an embodiment of the disclosure.

Referring to FIG. 3, according to an embodiment of the disclosure, an electronic device 101 may mean a device used by a user. The electronic device 101 may mean, for example, a terminal, a user equipment (UE), a mobile station, a subscriber station, a remote terminal, a wireless terminal, or a user device.

According to an embodiment of the disclosure, an access network (AN) 302 may provide a channel for wireless communication with the electronic device 101. The AN 302 may mean a radio access network (RAN), a base station, an eNodeB (eNB), a 5G node, a transmission/reception point (TRP), or a $5^{th}$ generation NodeB (5G NB).

According to an embodiment of the disclosure, a core network (CN) 303 may manage at least one of subscriber information of the electronic device 101, mobility of the electronic device 101, access authorization of the electronic device 101, traffic of the data packet, or charging policy. The CN 303 may include at least one of a user plane function (UPF) node, an access & mobility management function (AMF) node, a session management function (SMF) node, a unified data management (UDM) node, or a policy control function (PCF) node.

According to an embodiment of the disclosure, a data network (DN) (e.g., a first DN 304-1, a second DN 304-2) may provide a service (e.g., an Internet service, an IP multimedia subsystem (IMS) service) by transmitting and receiving data (or data packet) to the electronic device 101 through the CN 303 and AN 302. For example, the DNs 304-1 and 304-2 may be managed by a communication operator. According to an embodiment of the disclosure, the first DN 304-1 may be connected to a remote server 306, and the second DN 304-2 may be connected to an edge server 305 (e.g., the MEC server). For example, if the CN 303 is disposed adjacent to the AN 302 (or the edge server 305), the second DN 304-2 may be disposed adjacent to the CN 303.

According to an embodiment of the disclosure, the remote server 306 may provide content related to an application. For example, the remote server 306 may be managed by a content operator.

According to an embodiment of the disclosure, a plurality of applications (e.g., a first application (first App) 310-1, a second application (second App) 310-2, and the like) may be installed (or stored) in the electronic device 101. The plurality of applications may be, for example, one of a basic application pre-installed in the electronic device 101, an application provided by a communication operator, or a 3' party application. The plurality of applications may require different network services based on at least one of data transfer rate, latency (or rate), reliability, number of electronic devices accessed to the network, network access period of the electronic device 101, or average data usage. The different network services may include, for example, enhanced mobile broadband (eMBB), ultra-reliable and low latency communication (URLLC), or massive machine type communication (mMTC). The eMBB may mean a network service that requires high data transfer rate and low latency, such as, for example, a smartphone service. The URLLC may mean a network service that requires low latency and high reliability, such as, for example, a disaster relief network or vehicle to everything (V2X). The mMTC may mean a network service that does not require low latency while a plurality of entities are connected to each other, such as, for example, Internet of things (IoT).

According to an embodiment of the disclosure, the edge server 305 (e.g., the MEC server) may be disposed inside the base station (e.g., the AN 302) connected to the electronic device 101 or in a location geographically close to the base station and may provide content that is at least partially the same as the content provided by the remote server 306. Although not illustrated in FIG. 3, the edge server 305 may be disposed inside the CN 303 or may be disposed in a separate user computer. For example, while the remote server 306 may provide content to the electronic device 101 regardless of the location of the electronic device 101, the edge server 305 may have a locality for providing content to the electronic device 101 located adjacent to the edge server 305. According to an embodiment of the disclosure, the plurality of applications 310-1 and 310-2 of the electronic device 101 may perform data transmission with the remote server 306 or may perform data transmission based on the edge server 305 and edge computing (e.g., the MEC).

According to an embodiment of the disclosure, the plurality of applications 310-1 and 310-2 of the electronic device 101 may perform data transmission with the remote server 306 based on a requested service type (e.g., network service type, application service type and/or requirement) or may perform data transmission based on the edge server 305 and edge computing. For example, if the first App 310-1 does not require a low latency, the first App 310-1 may perform data transmission with the remote server 306. For another example, if the second App 310-2 requires a low latency, the second App 310-2 may perform data transmission with the edge server 305.

According to the other embodiment of the disclosure, the plurality of applications 310-1 and 320-2 may perform data transmission based on whether the electronic device 101 (or application) is subscribed to the edge computing service without considering a separate requirement. According to the other embodiment of the disclosure, if the application is an application provided by a communication operator, the application may perform data transmission without considering the separate requirement or whether to subscribe to the edge computing service.

Figure 4:
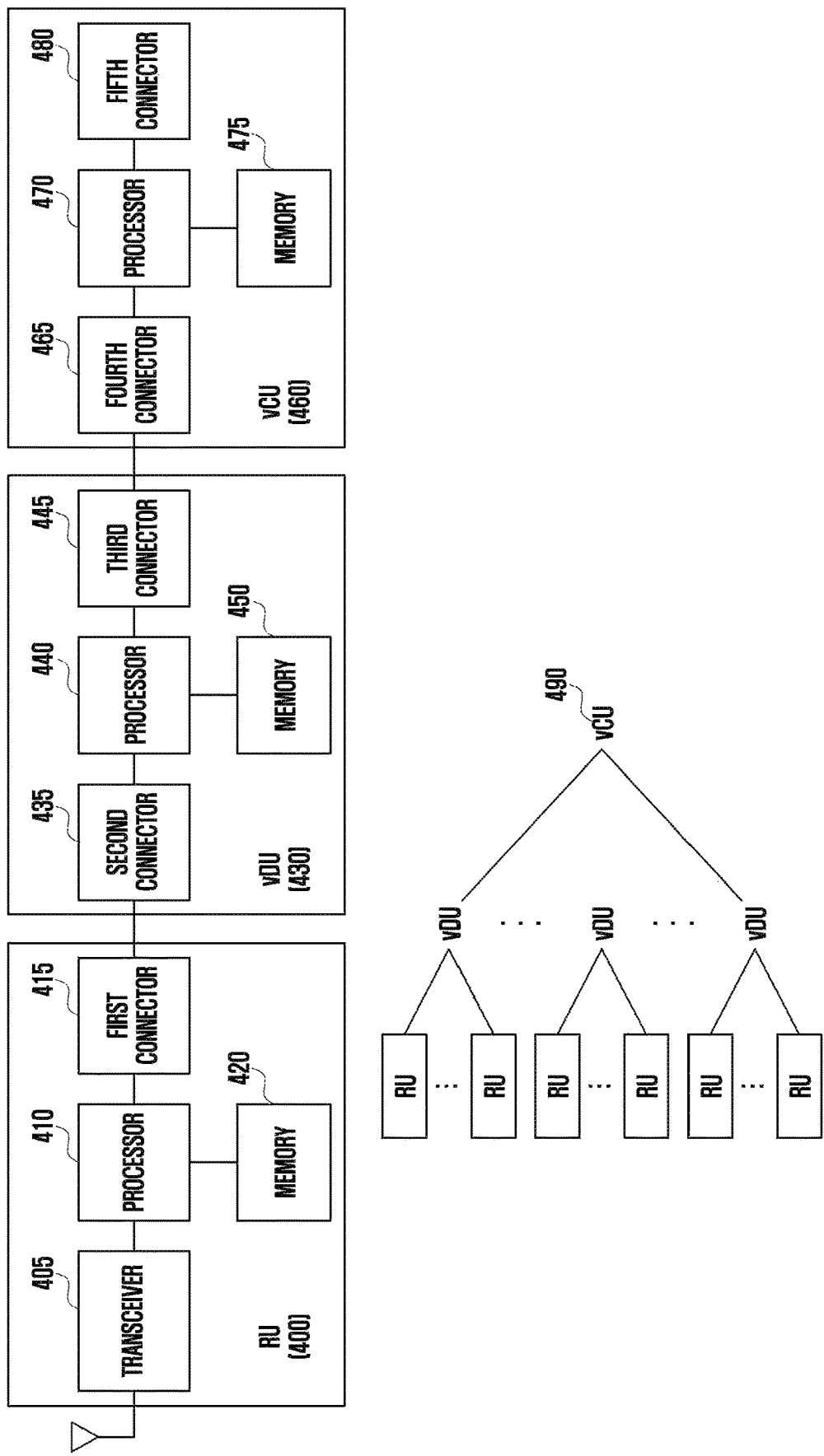
FIG. 4 is a drawing illustrating an internal structure of an RU, vDU, and vCU of a virtual base station according to an embodiment of the disclosure.

FIG. 4 is a drawing illustrating an internal structure of an RU, vDU, and vCU of a virtual base station according to an embodiment of the disclosure.

FIG. 4 is a brief representation of the internal structure of the virtual base station, and the structure of the virtual base station is not limited to the configuration of this drawing, and functions of the RU, vDU, and vCU are also not limited to the description of the disclosure.

Virtual radio access network (vRAN) means that a centralized-RAN (C-RAN) structure and a distributed-RAN (D-RAN) structure, which were configured with hardware equipment in an LTE environment and an NR environment, are implemented as software according to a performance improvement of the x86 commercial server. Therefore, due to the performance improvement of the x86 commercial server, operations in layer 1, layer 2, and layer 3 (L1/L2/L3) of the base station may be implemented as software in the x86 server. Due to the implementation of software, a data processing function which was performed for each existing hardware is implemented in one server, which may reduce equipment purchase costs and may increase efficiency by facilitating maintenance.

Referring to FIG. 4, a radio unit (or remoted unit (RU)) 400 of the base station includes a transceiver 405, a at least one processor 410, a first connector 415, and a memory 420. However, the component of the RU 400 of the base station is not limited to the above-described examples, and for example, the RU 400 of the base station may include more or fewer components than the illustrated component. In addition, the transceiver 405, the memory 420, and the at least one processor 410, and the like may be implemented in a single chip form. Hereinafter, the term 'connector' may refer to a connection circuit, a communication circuit, a connection interface, a communication interface, a communication connection circuit, a communication unit, a connection unit, a connection unit, and/or technical terms equivalent thereto, in addition to the connector.

The transceiver 405 may transmit and receive signal to and from the terminal. Herein, the signal may include control information and data. To this end, the transceiver 405 may be configured with an RF transmitter for up-converting and amplifying the frequency of a transmitted signal, and an RF receiver for low-noise amplifying a received signal and down-converting the frequency. However, this is only an embodiment of the transceiver 405, and the component of the transceiver 405 is not limited to the RF transmitter and the RF receiver. In addition, the transceiver 405 may output a signal to the at least one processor 410 by receiving the signal through a wireless channel and may transmit the signal outputted from the at least one processor 410 through the wireless channel. In addition, the transceiver 405 may have an RF transceiver for the LTE system and an RF transceiver for the NR system individually or may perform physical layer processing of the LTE and NR with one transceiver.

The memory 420 may store program and data necessary for operation of the RU of the base station. In addition, the memory 420 may store control information or data included in a signal transmitted and received by the RU of the base station. The memory 420 may be configured with a storage medium, such as a read only memory (ROM), a random access memory (RAM), a hard disk, a compact disc read only memory (CD-ROM), and a digital versatile disc (DVD), or a combination of storage media. In addition, the number of the memory 420 may be plural.

The at least one processor 410 may control a series of processes so that the RU 400 of the base station may operate according to the above-described embodiment of the disclosure. For example, the at least one processor 410 may transmit and receive LTE or NR signals to and from the terminal according to the C-plane message and the U-plane message received through the first connector 415 from a vDU 430 of the base station. The number of the at least one processor 410 may be plural, and the at least one processor 410 may perform a component control operation of the RU 400 of the base station by executing a program stored in the memory 420.

The first connector 415 is a device that connects the RU 400 of the base station and the vDU 430 of the base station, and may perform operations of processing a physical layer for message transmission and reception, transmitting a message to the vDU 430 of the base station, and receiving a message from the vDU 430 of the base station.

The vDU 430 of the base station includes a at least one processor 440, a second connector 435, a third connector 445, and a memory 450. However, the component of the vDU 430 of the base station is not limited to the above-described example, and for example, the vDU 430 of the base station may include more or fewer components than the illustrated component. In addition, the second connector 435, the third connector 445, the memory 450, and the at least one processor 440 may be implemented in a single chip form.

The at least one processor 440 may control a series of processes so that the vDU 430 of the base station may operate according to the above-described embodiment of the disclosure. For example, the at least one processor 440 may transmit a message to the RU 400 of the base station through the second connector 435 by generating a C-plane message and a U-plane message to be transmitted to the RU 400 of the base station. In addition, the at least one processor 440 may transmit the message to a vCU 460 of the base station through the third connector 445 by generating the C-plane message and the U-plane message to be transmitted to the vCU 460 of the base station. The number of the at least one processor 440 may be plural, and the at least one processor 440 may perform a component control operation of the vDU 430 of the base station by executing a program stored in the memory 450. In addition, the at least one processor 440 may be configured with an access distribute unit processing function (ADPF). The ADPF means a kubernates cluster (system operating unit) that does the things that the vDU has to support (The kubernates cluster means a unit called as a pod in which several linux docker containers and server resources (e.g., there may be CPU, MEM, disk, and the like) required for operating corresponding containers are grouped. The kubernates cluster may perform efficiently operating and managing these pods by turning them on or off at once. In addition, an existing docker was operated on one physical server, but a kubernates cluster may be operated on one or a plurality of physical servers, thereby supporting more diverse functions than the existing docker). The ADPF may be configured with a plurality of pods (one or more container units in minimum distribution unit in kubernates), and may be configured with database and management pod (DMP) (pod that performs DB and management function), performance management pod (PMP) (performs a function of transmitting performance management data to unified service management system (USM) after calculating a statistical value), cell resource management pod (CMP), remoted unit management pod (RMP) (manages connection status with RU), vDU interface pod (DIP) (manages connection between the vDU and other network element (e.g., vCU)), vDU processing pod (DPP) (manages main communication function (communication between L1, L2, and L3 layers)), and the like.

The memory 450 may store a program and data necessary for the operation of the vDU of the base station. In addition, the memory 450 may store control information or data included in the signal transmitted and received by the RU of the base station and the signal transmitted and received by the vCU of the base station. The memory 450 may be configured with a storage medium, such as the ROM, the RAM, the hard disk, the CD-ROM, and the DVD or a combination of storage media. In addition, the number of the memory 450 may be plural.

The second connector 435 is a device that connects the RU 400 of the base station and the vDU 430 of the base station, and may perform operations of processing the physical layer for message transmission and reception, transmitting a message to the RU 400 of the base station, and receiving a message from the RU 400 of the base station. In addition, the third connector 445 is a device that connects the vCU 460 of the base station and the vDU 430 of the base station, and may perform operations of processing physical layer for message transmission and reception, transmitting a message to the vCU 460 of the base station, and receiving a message from the vCU 460 of the base station.

The vCU 460 of the base station includes a at least one processor 470, a fourth connector 465, a fifth connector 480, and a memory 475. However, the component of the vCU 460 of the base station is not limited to the above-described example, and for example, the vCU 460 of the base station may include more or fewer components than the illustrated component. In addition, the fourth connector 465, the fifth connector 480, the memory 475, and the at least one processor 470 may be implemented in a single chip form.

The at least one processor 470 may control a series of processes so that the vCU 460 of the base station may operate according to the above-described embodiment of the disclosure. For example, the at least one processor 470 may transmit a message to the vDU 430 of the base station through the fourth connector 465 by generating a C-plane message and a U-plane message to be transmitted to the vDU 430 of the base station. In addition, the at least one processor 470 may transmit the message to a core network device through the fifth connector 480 by generating the C-plane message and the U-plane message to be transmitted to the core network device. The number of the at least one processor 470 may be plural, and the at least one processor 470 may perform a component control operation of the vCU 460 of the base station by executing a program stored in the memory 475. In addition, the at least one processor 470 may be configured with an access control plane function (ACPF) and an access user plane function (AUPF). The ACPF means a kubernates cluster that supports what the control plane of vCU does, and the AUPF means a kubernates cluster that supports what the user plane of vCU does.

The memory 475 may store a program and data necessary for the operation of the vCU of the base station. In addition, the memory 475 may store control information or data included in a signal transmitted and received by the vDU of the base station and the core network device. The memory 475 may be configured with a storage medium, such as the ROM, RAM, hard disk, CD-ROM, and DVD or a combination of storage media. In addition, the number of the memory 475 may be plural.

The fourth connector 465 is a device that connects the vDU 430 of the base station, and may perform operations of processing the physical layer for message transmission and reception, transmitting a message to the vDU 430 of the base station, and receiving a message from the vDU 430 of the base station. In addition, the fifth connector 480 is a device that connects the core network device and the vCU 460 of the base station, and may perform operations of processing physical layer for message transmission and reception, transmitting a message to the core network device, and receiving a message from the core network device.

There may be a plurality of such the RU 400, vDU 430, and vCU 460, and may be configured with architecture 490 of pyramid structure.

In addition, the virtual base station also wants to provide a MEC-based service. However, a $3^{rd}$ party company or a communication operator that actually wants to provide data and an application service to a user lacks interfacing technology for a communication protocol and a virtual base station structure, and thus a linked operation with software provided in the virtual base station is limited, so there is a problem in using the MEC-based service. In addition, in order to support a URLLC function required by the 5G system, an edge server providing the MEC-based service was disposed geographically close to the base station, but in vRAN implemented as software, there was no suitable solution for implementing the edge server (e.g., cache server pod and MEC-vRAN switch pod).

Therefore, through an embodiment of the disclosure, based on information obtained from a $3^{rd}$ party company or communication operator, a method and device for implementing a cache server pod and an MEC-vRAN switch pod in a vRAN into the vDU or vCU are proposed.

Figure 5:
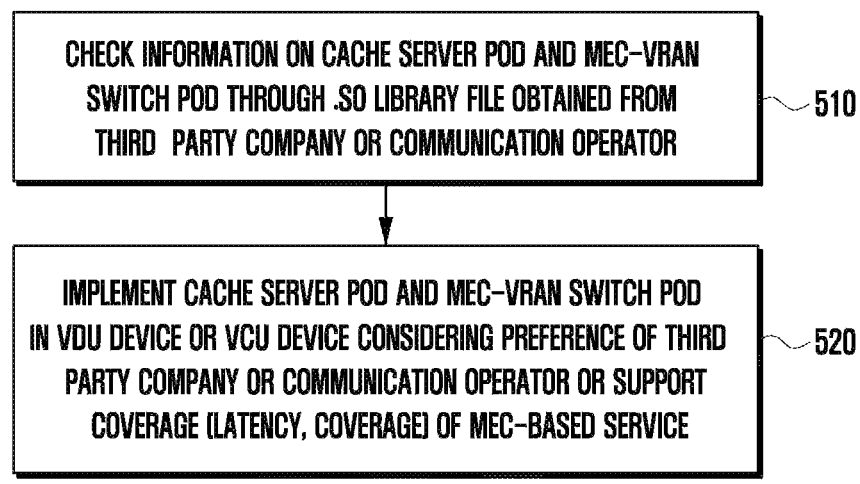
FIG. 5 is a drawing illustrating an operation sequence of a at least one processor of a virtual base station for determining a structure of the virtual base station according to an embodiment of the disclosure.

FIG. 5 is a drawing illustrating an operation sequence of a at least one processor of a virtual base station for determining a structure of the virtual base station according to an embodiment of the disclosure.

Referring to FIG. 5, in operation 510, at least one processor of a vDU or at least one processor of a vCU of the virtual base station may check information on a cache server pod and a MEC-vRAN switch pod through a .so library file obtained from a $3^{rd}$ party company or communication operator.

The cache server pod means a pod in which data for a service provided by the $3^{rd}$ party company or communication operator is stored as cache data. In addition, the MEC-vRAN switch pod may first determine whether data requested from the terminal or the data to be transmitted to the terminal is in the cache server pod. If there is data requested or data to be transmitted in the cache server pod, it may be controlled to receive data from the corresponding cache server pod and transmit it to the terminal, and if there is no data requested or data to be transmitted in the cache server pod, it may be controlled to request the corresponding data from a core network and then synchronize the requested data back to the cache server pod. The MEC-vRAN switch pod is implemented by REST API, and the corresponding operation will be described in FIG. 8.

In addition, in operation 520, the cache server pod and the MEC-vRAN switch pod may be implemented in the vDU or the vCU by considering a content indicated through the .so library file obtained from the $3^{rd}$ party company or communication operator or a support coverage (coverage of allowable latency or coverage of cells to be covered) of an MEC-based service.

In a case of the cache server pod and the MEC-vRAN switch pod are implemented in the vDU (FIG. 6), the operation from the terminal to the cache server pod is simplified compared to a case of the cache server pod and the MEC-vRAN switch pod are implemented in the vCU (FIG. 7), so there is an advantage of low latency. However, in the case of the cache server pod and the MEC-vRAN switch pod are implemented in the vDU (FIG. 6), the MEC-based service is provided only in an RU connected to the implemented vDU, so there is a limitation of the coverage of cells capable of providing the MEC-based service is small.

Figure 6:
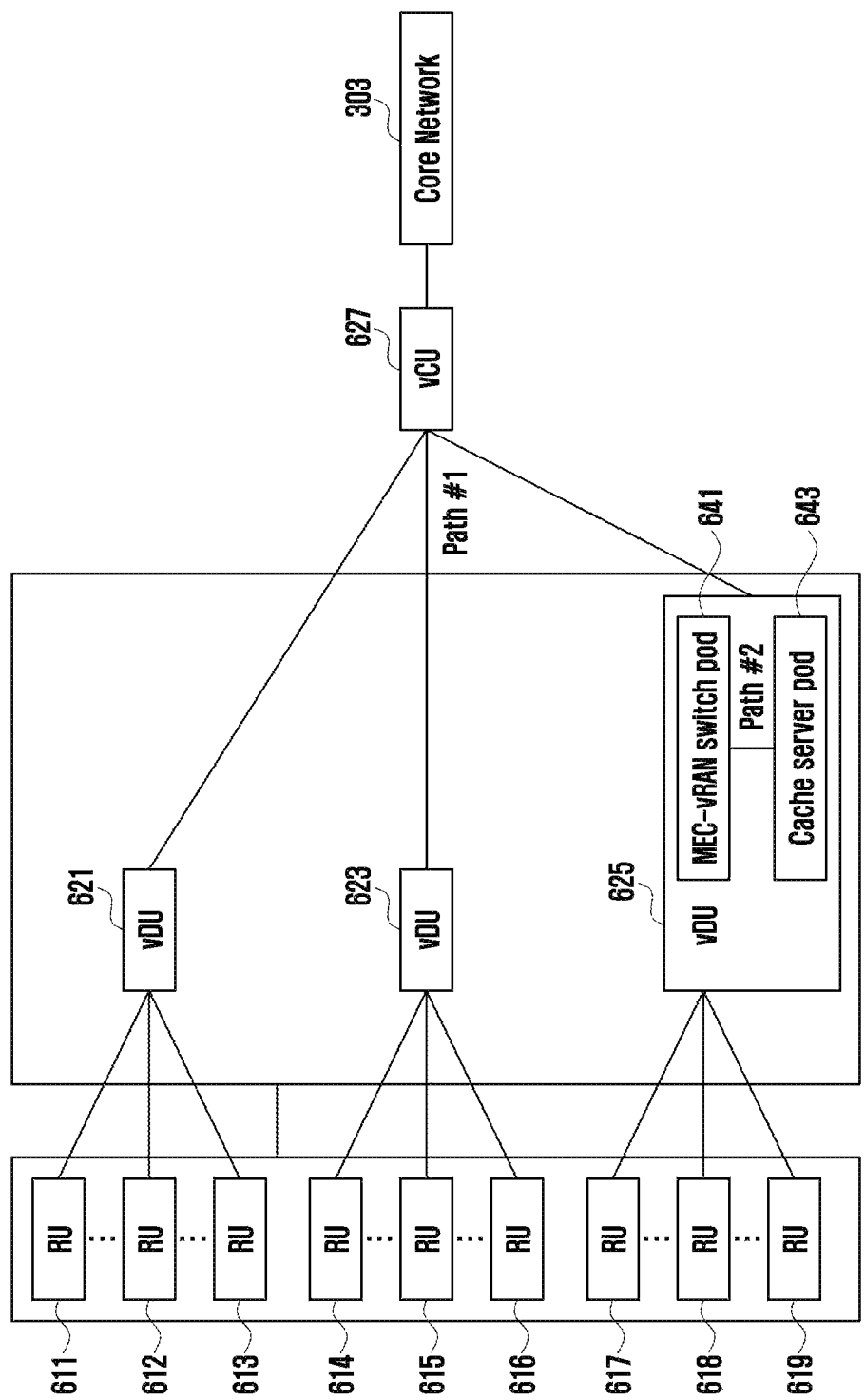
FIG. 6 is a drawing illustrating a structure in which an MEC-vRAN switch pod and a cache data pod are formed in a vDU of a virtual base station according to an embodiment of the disclosure.

Conversely, in the case of the cache server pod and the MEC-vRAN switch pod are implemented in the vCU (FIG. 7), there is an advantage in that the coverage of cells capable of providing the MEC-based service is larger compared to the case of the cache server pod and the MEC-vRAN switch pod are implemented in the vDU (FIG. 6). For example, if the number of NR cells supported per vDU is about 24, the number of NR cells supported per vCU is about 100. However, in the case of the cache pod and the MEC-vRAN switch pod are implemented in the vCU (FIG. 7), there is a limitation that the latency is greater compared to the case of the cache server pod and the MEC-vRAN switch pod are implemented in the vDU (FIG. 6).

According to an embodiment of the disclosure, the $3^{rd}$ party company or communication operator may implement a vRAN base station by considering the coverage of cells and latency to which the MEC-based service is to be provided according to the characteristics of the service they want to support.

FIG. 6 is a drawing illustrating a structure in which an MEC-vRAN switch pod and a cache data pod are formed in a vDU of a virtual base station according to an embodiment of the disclosure.

Referring to FIG. 6, according to the first embodiment of the disclosure, in order to provide an MEC-based service in the virtual base station, an MEC-vRAN switch pod 641 and a cache data pod 643 may be implemented in a vDU 625. The MEC-vRAN switch pod 641 may be configured in at least one processor of the vDU 625, and the cache data pod 643 may be configured in a memory of the vDU 625.

The MEC-vRAN switch pod 641 may preferentially determine whether data requested from a terminal or data to be transmitted to the terminal is in the cache server pod 643. If there is the data requested or the data to be transmitted in the cache server pod 643, the MEC-vRAN switch pod 641 may control to receive data from the corresponding cache server pod 643 and transmit it to the terminal (path #2). If there is no data requested or data to be transmitted in the cache server pod 643, the MEC-vRAN switch pod 641 may request the corresponding data from a vCU 627 in order to control to request the corresponding data from a core network 303, and then may control to synchronize the requested data to the cache server pod again (path #1). The vCU 627 may communicate with a vDU 621, a vDU 623, and a vDU 625. The vDU 621 may communicate with a radio unit (RU) 611, a RU 612, and a RU 613. The vDU 623 may communicate with a RU 614, a RU 615, and a RU 616. The vDU 625 may communicate with a RU 617, a RU 618, and a RU 619. The MEC-vRAN switch pod is implemented by REST API, and the corresponding operation will be described in FIG. 8.

Figure 7:
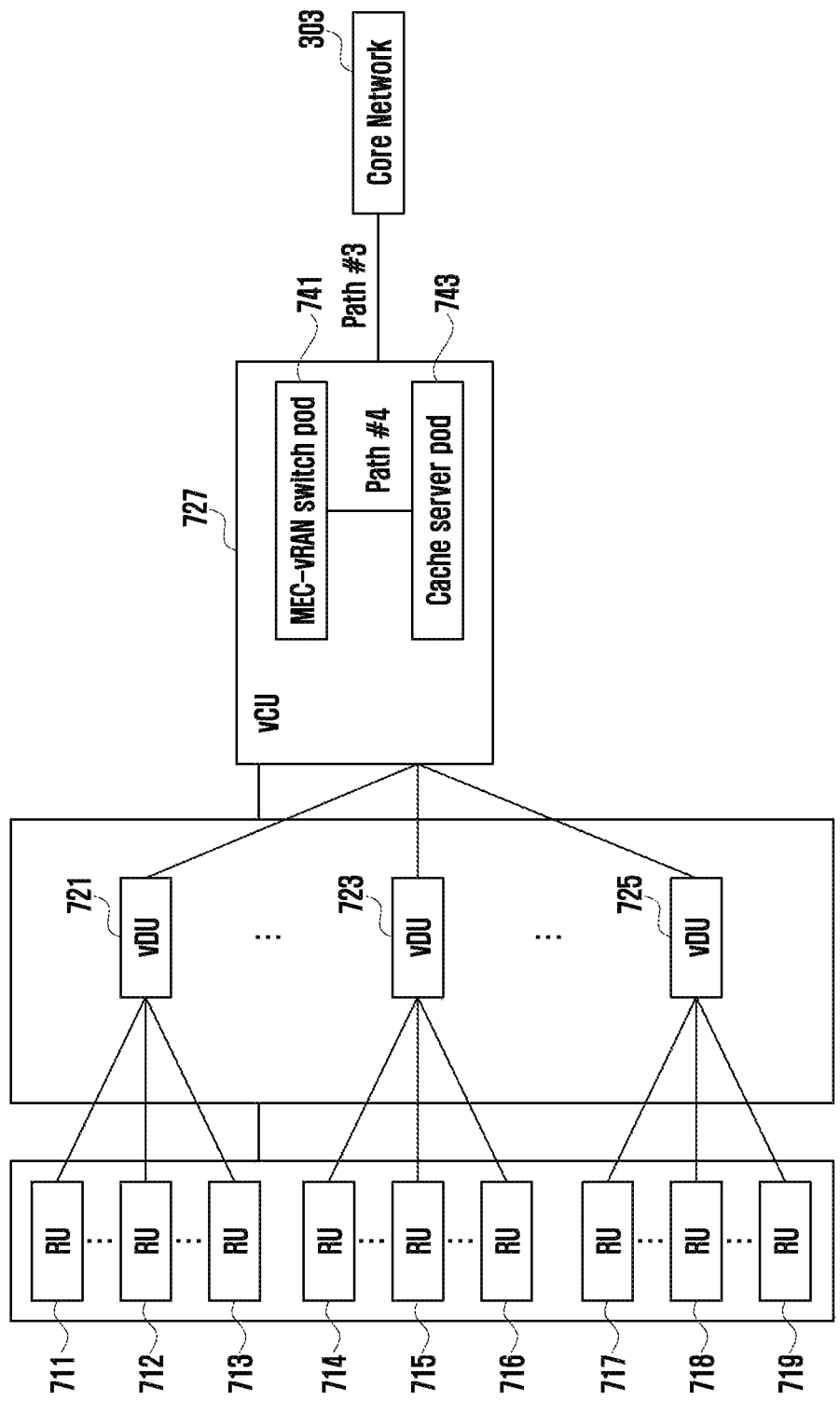
FIG. 7 is a drawing illustrating a structure in which an MEC-vRAN switch pod and a cache data pod are formed in a vCU of a virtual base station according to an embodiment of the disclosure.

FIG. 7 is a drawing illustrating a structure in which an MEC-vRAN switch pod and a cache data pod are formed in a vCU of a virtual base station according to an embodiment of the disclosure.

Referring to FIG. 7, according to the second embodiment of the disclosure, in order to provide an MEC-based service in the virtual base station, an MEC-vRAN switch pod 741 and a cache data pod 743 may be implemented in a vCU 727. The MEC-vRAN switch pod 741 may be configured in at least one processor of the vCU, and the cache data pod 743 may be configured in a memory of the vCU. The vCU 727 may communicate with a vDU 721, a vDU 723, and a vDU 725. The vDU 721 may communicate with a RU 711, a RU 712, and a RU 713. The vDU 723 may communicate with a RU 714, a RU 715, and a RU 716. The vDU 725 may communicate with a RU 717, a RU 718, and a RU 719.

The MEC-vRAN switch pod 741 may preferentially determine whether data requested from a terminal or data to be transmitted to the terminal is in the cache server pod 743. If there is the data requested or the data to be transmitted in the cache server pod 743, the MEC-vRAN switch pod 741 may control to receive data from the corresponding cache server pod 743 and transmit it to the terminal (path #4). If there is no data requested or data to be transmitted in the cache server pod 743, the MEC-vRAN switch pod 741 may control to request the corresponding data from a core network 303, and then may control to synchronize the requested data to the cache server pod again (path #3). The MEC-vRAN switch pod is implemented by REST API, and the corresponding operation will be described in FIG. 8.

Figure 8:
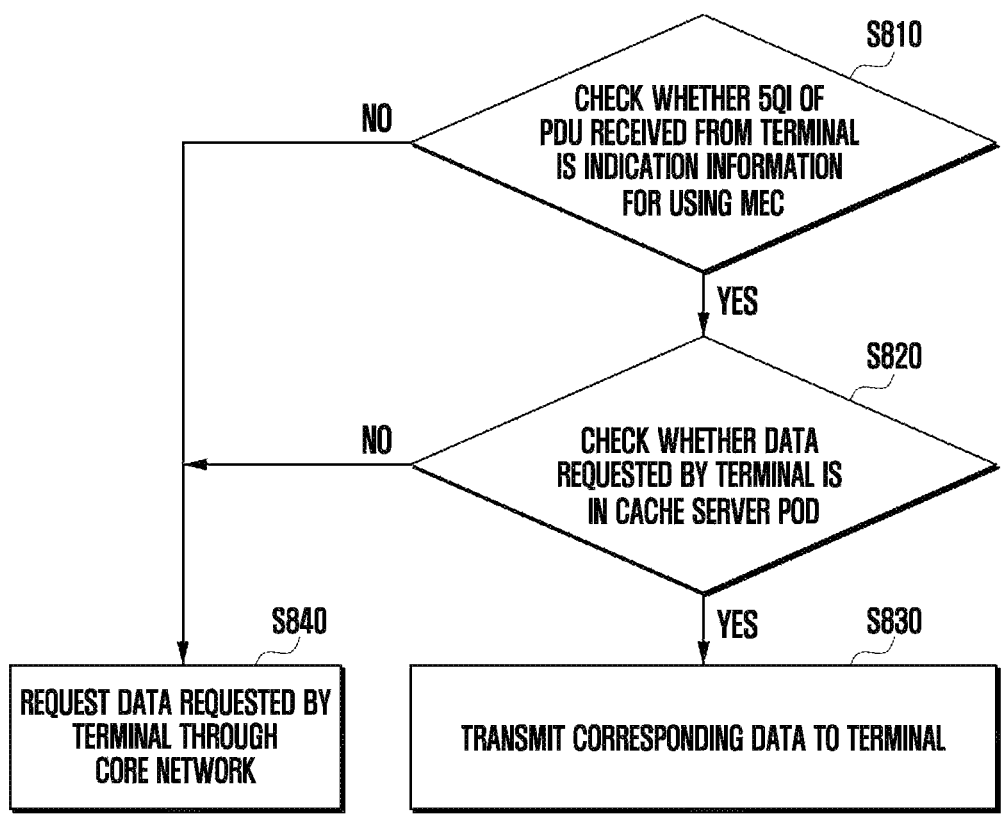
FIG. 8 is a drawing illustrating an operation sequence of an MEC-vRAN switch pod of a virtual base station according to an embodiment of the disclosure.

FIG. 8 is a drawing illustrating an operation sequence of an MEC-vRAN switch pod of a virtual base station according to an embodiment of the disclosure.

The MEC-vRAN switch pod may be implemented through a .so library file obtained from a 3$^{rd}$ party company or communication operator. In addition, while the existing vRAN and MEC-based service were not based on a unified programming language, so communication was difficult, whereas the MEC-vRAN switch pod may be implemented through HTTP GET (request to send a resource to a server)/POST (request to generate a resource while sending it to the server)/PUT (request the server to update a resource or generate a new resource)/DELETE (request the server to delete a resource) operations by creating an API in HTTP format using representational state transfer (REST) application programming interface (API).

For example, the MEC-vRAN switch pod may implement support of the MEC-based service in the vRAN by using the following two APIs (GET/data: URI, GET/data/sync). GET/data:URI is an API that requests data indicated by a URI. When GET/data:URI is received, an uplink protocol data unit (PDU) sent by the terminal may be interpreted and a unique resource indicator (URI) may be found. In addition, by determining what data is requested, if the corresponding data is in the cache server pod, the corresponding data may be transmitted in a response, and if the corresponding data is not in the cache server pod, an HTTP 404 error code may be transmitted in a response. In addition, GET/data/sync is the API that requests the cache server pod to synchronize data with an external server through the Internet. When GET/data/sync is received, data is requested to be synchronized, and when the data is synchronized, an HTTP 200 code may be transmitted in a response, and when the data synchronization fails, an HTTP 408 error code may be transmitted in a response.

Referring to FIG. 8, operation of the MEC-vRAN switch pod is the same in case that the MEC-vRAN switch pod and the cache server pod are implemented in the vDU and in case that the MEC-vRAN switch pod and the cache server pod are implemented in the vCU.

In operation S810, when the virtual base station receives uplink protocol data unit (PDU) session information from the terminal, the MEC-vRAN switch pod may check from the terminal whether the 5G quality of service identifier (5QI) of PDU received is indication information for using the MEC.

And, in operation S820, the MEC-vRAN switch pod may check whether the data requested by the terminal is in the cache server pod in case that the indicator information (e.g., fifth generation quality of service identifier (5QI)) of the PDU received from the terminal by the virtual base station is indicator information for using the MEC (e.g., the mobile edge computing).

And, in operation S840, the MEC-vRAN switch pod may request the data requested by the terminal to the core network in case that the indicator information of the PDU received from the terminal by the virtual base station is not indicator information for using the MEC.

And, in operation S830, the MEC-vRAN switch pod may transmit the corresponding data to the terminal in case that the data requested by the terminal is in the cache server pod.

And, in operation S840, the MEC-vRAN switch pod may request the data requested by the terminal to the core network and may update the data received by the request to the cache server pod in case that the data requested by the terminal is not in the cache server pod.

Through this, according to an embodiment of the disclosure, by processing user traffic in the vDU or vCU without going through the core network, there is an effect of further reducing a latency rate, which is a URLLC function required by a system, and an effect of reducing the installation cost for the core network required when providing an existing MEC-based service.

In addition, according to an embodiment of the disclosure, by providing the MEC-based service in the virtual base station suitable for each 3$^{rd}$ party company or communication operator, each 3$^{rd}$ party company or communication operator has the effect of reducing the storage capacity required for providing the MEC-based service within a general base station and using the remaining storage capacity secured through this for other services.

Methods according to the embodiments described in the claim or specification of the disclosure may be implemented in the form of hardware, software, or a combination of hardware and software.

In a case of implementing as software, a computer readable storage medium for storing one or more programs (software modules) may be provided. The one or more programs stored in the computer readable storage medium may be configured to be executable by one or more processors in an electronic device. The one or more programs may include instructions for causing an electronic device to execute methods according to the embodiments described in the claim and description of the disclosure.

Such programs (software modules, software) may be stored on a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or magnetic cassette, which is other form of optical storage device. Alternatively, it may be stored in a memory configured with a combination of some or all thereof. In addition, each composition memory may be included in plurality.

In addition, the program may be stored in an attachable storage device accessible through a communication network, such as the Internet, an intranet, local area network (LAN), wide LAN (WLAN), or a storage area network (SAN), or a communication network configured with a combination thereof. Such a storage device may be accessed to a device performing an embodiment of the disclosure through an external port. In addition, a separate storage device on the communication network may be accessed to the device performing an embodiment of the disclosure.

In the specific embodiments of the disclosure described above, components included in the disclosure are expressed in singular or plural numbers according to the specific embodiment presented. However, the singular or plural expressions are selected appropriately for the presented situation for convenience of description, and the disclosure is not limited to the singular or plural components, and components expressed in a plurality may be configured with a singular number, or components expressed in a singular may be configured with plural numbers.

Meanwhile, the embodiments of the disclosure disclosed in the description and drawings are only presented as specific examples to easily explain the technical content of the disclosure and help understanding of the disclosure, and are not intended to limit the coverage of the disclosure. In other words, it is obvious to those having ordinary knowledge in the art which the disclosure belongs that other modified examples based on a technical idea of the disclosure may be implemented. In addition, each of the above embodiments may be operated in combination with each other as necessary. For example, a base station and a terminal may be operated by combining parts of an embodiment of the disclosure and another embodiment each other. For example, a base station and a terminal may be operated by combining parts of a plurality of embodiments of the disclosure each other. In addition, although the above embodiments have been presented based on a frequency division duplex (FDD) LTE system, other modified examples based on the technical idea of the above embodiment may be implemented in other systems, such as a time division duplex (TDD) LTE system, a 5G, or an NR system, and the like.

In the specific embodiments of the disclosure described above, components included in the disclosure are expressed in singular or plural numbers according to the specific embodiment presented. However, the singular or plural expressions are selected appropriately for the presented situation for convenience of description, and the disclosure is not limited to the singular or plural components, and components expressed in a plurality may be configured with a singular number, or components expressed in a singular may be configured with plural numbers.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A device for performing a function of a distributed unit (DU) of a base station in a wireless communication, the device comprising:
   a memory configured to store cache data related to an application executed by a terminal connected with the DU via a radio unit (RU); and
   at least one processor configured to:
      receive, from the terminal via the RU, a protocol data unit (PDU) for requesting data related to the application,
      based on identifying that a quality indicator included in the PDU is related to mobile edge computing, identify whether requested data corresponds to the cache data,
      based on the requested data corresponding to the cache data, transmit, via the RU, to the terminal, the cache data, and
      based on the requests data distinct from the cache data:
         transmit, to a server providing data related to the application, a request message to receive the requested data,
         receive the requested data from the server providing data related to the application, and
         transmit, to the terminal via the RU, the requested data.

2. The device of claim 1, wherein the at least one processor is configured to, based on identifying that the quality indicator is not related to mobile edge computing, transmit, to the server, a request message to receive the requested data.

3. The device of claim 1, wherein the request message is transmitted to the server via a core network including at least one of a user plane function (UPF) node, an access and mobility management function (AMF) node, a session management function (SMF) node, a unified data management (UDM) node, or a policy control function (PCF) node.

4. The device of claim 1, wherein the cache data is updated through a representational state transfer application programming interface (REST API) based on receiving the requested data from the server.

5. A device for performing a function of a central unit (CU) of a base station in a wireless communication system, the device comprising:
   a memory configured to store cache data related to an application executed by a terminal connected with the CU via a distributed unit (DU) and a radio unit (RU); and
   at least one processor configured to:
      receive, from the terminal via DU, a protocol data unit (PDU) for requesting data related to the application,
      based on identifying that a quality indicator included in the PDU is related to a mobile edge computing, identify whether requested data corresponds to the cache data,
      based on the requested data corresponding to the cache data, transmit, via the DU and the RU, to the terminal, the cache data, and
      based on the requests data distinct from the cache data:
         transmit, to a server providing data related to the application, a request message to receive the requested data,
         receive the requested data from the server providing data related to the application, and
         transmit, to the terminal via the DU and the RU, the requested data.

6. The device of claim 5, wherein the at least one processor is configured to, based on identifying that the quality indicator is not related to the mobile edge computing, transmit, to the server, a request message to receive the requested data.

7. The device of claim 5, wherein the request message is transmitted to the server via a core network including at least one of a user plane function (UPF) node, an access and mobility management function (AMF) node, a session management function (SMF) node, a unified data management (UDM) node, or a policy control function (PCF) node.

8. The device of claim 5, wherein the cache data is updated through a representational state transfer application programming interface (REST API) based on receiving the requested data from the server.

9. A method performed by a device for performing a function of a distributed unit (DU) of a base station in a wireless communication system, the method comprising:
- receiving, from a terminal via DU, a protocol data unit (PDU) for requesting data related to an application;
- based on identifying that a quality indicator included in the PDU is related to a mobile edge computing, identifying whether requested data corresponds to cache data stored in memory of the device, cache data being related to the application executed by the terminal;
- based on the requested data corresponding to the cache data, transmitting, via the DU and a radio unit (RU), to the terminal, the cache data; and
- based on the requests data distinct from the cache data:
  - transmitting, to a server providing data related to the application, a request message to receive the requested data,
  - receiving the requested data from the server providing data related to the application, and
  - transmitting, to the terminal via the DU and the RU, the requested data.

10. The method of claim 9, comprising, based on identifying that the quality indicator is not related to the mobile edge computing, transmitting, to the server, a request message to receive the requested data.

11. The method of claim 9,
- wherein request message is transmitted to the server via a core network including at least one of a user plane function (UPF) node, an access and mobility management function (AMF) node, a session management function (SMF) node, a unified data management (UDM) node, or a policy control function (PCF) node.

12. The method of claim 9, wherein the cache data is updated through a representational state transfer application programming interface (REST API) based on receiving the requested data from the server.

13. A method performed by a device for performing a function of a central unit (CU) of a base station in a wireless communication system, the method comprising:
- receiving, from a terminal via DU, a protocol data unit (PDU) for requesting data related to an application;
- based on identifying that a quality indicator included in the PDU is related to a mobile edge computing, identifying whether requested data corresponds to cache data;
- based on the requested data corresponding to the cache data, transmitting, via the DU and a radio unit (RU), to the terminal, the cache data; and
- based on the requests data distinct from the cache data:
  - transmitting, to a server providing data related to the application, a request message to receive the requested data,
  - receiving the requested data from the server providing data related to the application, and
  - transmitting, to the terminal via the DU and the RU, the requested data.

14. The method of claim 13, comprising, based on identifying that the quality indicator is not related to the mobile edge computing, transmitting, to the server, a request message to receive the requested data.

15. The method of claim 13,
- wherein request message is transmitted to the server via a core network including at least one of a user plane function (UPF) node, an access and mobility management function (AMF) node, a session management function (SMF) node, a unified data management (UDM) node, or a policy control function (PCF) node.

16. The method of claim 13, wherein the cache data is updated through a representational state transfer application programming interface (REST API) based on receiving the requested data from the server.

* * * * *